July 31, 1928.
W. N. BOOTH
VEHICLE WHEEL
Filed May 11, 1925
1,679,113
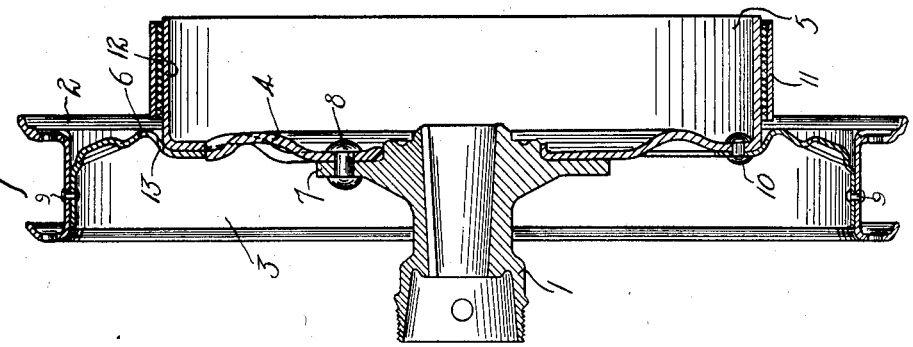
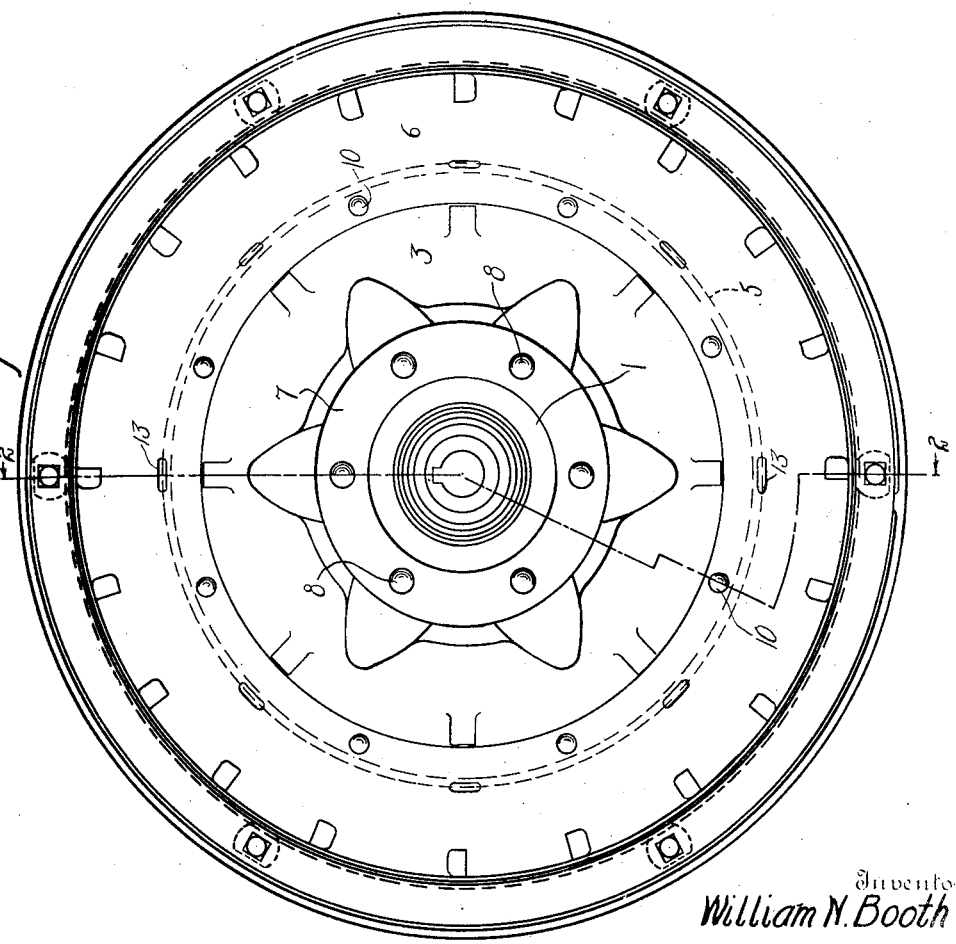
Inventor
William N. Booth
Attorneys Patented July 31, 1928.

1,679,113

UNITED STATES PATENT OFFICE.

WILLIAM N. BOOTH, OF DETROIT, MICHIGAN.

VEHICLE WHEEL.

Application filed May 11, 1925. Serial No. 29,609.

The invention relates to vehicle wheels and refers more particularly to vehicle wheels of the disk type. One of the objects of the invention is to make provision for determining the position of the brake band relative to the brake flange of the wheel without the necessity of removing the wheel or disturbing its web. Another object is to mount the tire carrying rim upon the brake drum by means of a spacer of disk form, which, with the web of the brake drum, forms the wheel web and which is provided with apertures for the passage of a suitable instrument therethrough and between the brake flange and brake band to determine the position of the brake band relative to the brake flange. With these as well as other objects in view the invention resides in the novel features of construction as more fully hereinafter set forth.

In the drawings:—

Figure 1 is a side elevation of a vehicle wheel embodying my invention;

Figure 2 is a cross section on the line 2—2 of Figure 1.

1 is the hub of a motor vehicle wheel and 2 the permanent rim or felly upon which is seated the demountable tire carrying rim. 3 is the web of the wheel which in the present instance comprises the web 4 of the brake drum 5 and the annular spacer 6 of disk form, the brake drum web being secured to the radial flange 7 of the hub by suitable means such as the rivets 8 and the spacer being secured to the permanent rim or felly by suitable means such as the rivets 9 and also being preferably permanently secured to the brake drum by suitable means such as the rivets 10. In the present instance the spacer is secured to the front side of the outer portion of the brake drum web.

For the purpose of determining whether the brake band 11 is properly positioned relative to the brake flange 12 of the brake drum without the necessity of removing the wheel or of disturbing its web I have provided in the spacer 6 the series of circumferential elongated apertures 13 which are preferably located at points intermediate the rivets 10 and in alignment with the brake surface of the brake flange 12, this brake surface being in the present instance the external surface since the brake band is outside the brake drum. These apertures 13 are of a size to permit of the passage therethrough of a suitable instrument such as a feeler gage which may extend between the brake flange and brake band to thereby determine the clearance between the same.

With this arrangement it will be readily seen that I have provided a simple construction of disk wheel having provision for determining the position of the brake band relative to the brake flange without the necessity of removing the wheel or disturbing its web.

What I claim as my invention is:

1. In a disk wheel, the combination with a brake flange and a brake element engageable therewith, of a wheel web formed with an aperture therein for the passage of an instrument therethrough and between the brake flange and brake band.

2. In a disk wheel, the combination with a brake drum having a brake flange for engagement by a brake element and a web, of a web member mounted upon said brake drum and forming with the web thereof the wheel web, one of said wheel web members having an aperture therein for the passage of an instrument therethrough and between the brake flange and brake element.

3. In a disk wheel, the combination with a brake drum having a brake flange for engagement by a brake element and a web, of a rim, a web member between said rim and brake drum and located in advance of said brake element and provided with angularly spaced apertures in substantial lateral alignment with the contacting surface of said brake element and brake flange for the passage of an instrument therethrough and between the brake element and brake flange.

4. In a disk wheel having a rim, the combination with a brake drum having a flange for engagement by a brake element, of a web member having a portion in front of said brake element and brake drum and provided with angularly spaced circumferentially elongated apertures in substantial lateral alignment with the braking surface of said brake flange for the passage of an instrument therethrough and between said brake element and brake flange.

In testimony whereof I affix my signature.

WILLIAM N. BOOTH.